US010422888B1

(12) United States Patent
Ianakiev et al.

(10) Patent No.: US 10,422,888 B1
(45) Date of Patent: Sep. 24, 2019

(54) SCINTILLATION DETECTORS

(71) Applicant: Los Alamos National Security, LLC, Los Alamos, NM (US)

(72) Inventors: Kiril D. Ianakiev, Los Alamos, NM (US); Martyn Thomas Swinhoe, Los Alamos, NM (US); Markus Peter Hehlen, Los Alamos, NM (US); Metodi Iliev, Los Alamos, NM (US); Andrea Favalli, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 430 days.

(21) Appl. No.: 15/198,719

(22) Filed: Jun. 30, 2016

Related U.S. Application Data

(60) Provisional application No. 62/194,139, filed on Jul. 17, 2015.

(51) Int. Cl.
*G01T 1/20* (2006.01)
(52) U.S. Cl.
CPC .................................. *G01T 1/2002* (2013.01)
(58) Field of Classification Search
CPC ........... G01T 1/2002; G01T 1/20; G01T 1/36; G01T 1/28; G01T 1/169; G01T 1/201
USPC ........................................................ 250/362
See application file for complete search history.

(56) References Cited

U.S. PATENT DOCUMENTS

| 3,769,059 | A | * | 10/1973 | Driard ....................... G01T 1/20 |
|   |   |   |   | 250/214 LA |
| 4,447,721 | A | * | 5/1984 | Wang .................... H01J 31/505 |
|   |   |   |   | 250/214 VT |
| 4,604,545 | A |   | 8/1986 | McDonie et al. |
| 7,495,223 | B2 |   | 2/2009 | Shimoi et al. |
| 7,902,517 | B1 |   | 3/2011 | Ianakiev et al. |
| 7,977,640 | B2 |   | 7/2011 | Bush |
| 8,581,188 | B2 |   | 11/2013 | Barbi et al. |
| 8,884,212 | B2 |   | 11/2014 | Holzleitner et al. |
| 2007/0138399 | A1 | * | 6/2007 | Simonetti ................. G01T 1/20 |
|   |   |   |   | 250/370.11 |
| 2010/0224785 | A1 |   | 9/2010 | Chiyoma et al. |
| 2013/0009069 | A1 |   | 1/2013 | Okada |
| 2013/0248724 | A1 |   | 9/2013 | Kawata et al. |
| 2013/0324844 | A1 |   | 12/2013 | Knowland et al. |
| 2014/0001365 | A1 |   | 1/2014 | Akers et al. |
| 2014/0015082 | A1 |   | 1/2014 | Kawanishi et al. |
| 2015/0001397 | A1 | * | 1/2015 | Yang ........................ B01J 20/06 |
|   |   |   |   | 250/361 R |

OTHER PUBLICATIONS

Derenzo et al., "Scintillation Properties," online at scintillator.lbl. gov/, 21 pages, downloaded May 28, 2015.

(Continued)

*Primary Examiner* — David P Porta
*Assistant Examiner* — Meenakshi S Sahu
(74) *Attorney, Agent, or Firm* — Klarquist Sparkman, LLP

(57) ABSTRACT

Devices/apparatuses are disclosed that include a photoemitting component, a photosensitive component deposited on the photoemitting component, a charge collection component, and a hollow enclosure for housing the photoemitting component, the photosensitive component, the charge collection component, or combinations thereof. Methods for making and using the apparatuses are also disclosed.

23 Claims, 6 Drawing Sheets

(56) References Cited

OTHER PUBLICATIONS

"Photomultipilier Handbook," *Burle Technologies, Inc.*, 179 pages, 1980.
"Development of 20-inch PMT," *Hamamatsu Photonics*, online at hamamatsu.com/us/en/technology/projects/20inch_pmt/index.html, 5 pages, downloaded Jun. 28, 2016.
"Large Format PMTs from Hamamatsu Photonics," *Hamamatsu Photonics K.K. Electron Tube Division*, online at .slac.stanford.edu/econf/C0504071/pdf/hamamatsu.pdf, 21 pages, downloaded Jun. 28, 2016.

* cited by examiner

SCINTILLATION DETECTORS

REFERENCE TO RELATED APPLICATION(S)

This application claims the benefit of U.S. Provisional Application No. 62/194,139, filed Jul. 17, 2015, which is incorporated herein by reference in its entirety.

ACKNOWLEDGMENT OF GOVERNMENT SUPPORT

This invention was made with government support under Contract No. DE-AC52-06NA25396 awarded by the U.S. Department of Energy. The U.S. government has certain rights in the invention.

FIELD

The devices and methods disclosed herein relate to the field of radiation detection.

BACKGROUND

Radiation detection plays a vital role in many fields, including areas of industry, research, and national security. Thus, radiation detectors are important. However, current limitations of radiation detectors limit or prevent their use in many important ways. For example, some materials that have features desirable in radiation detection cannot be used because current devices degrade or destroy the quality of the signals output by those materials. Similarly, inefficiencies in shape and design result in significant information loss. Thus, improvements can be made in radiation detection.

SUMMARY

An apparatus is disclosed, comprising a photoemitting component, a photosensitive component, a photoelectron collection component, and a hollow enclosure for housing the photoemitting component, the photosensitive component, the photoelectron collection component, or a combination of two or more thereof. The photosensitive component is in direct contact (or optically direct contact) with the photoemitting component, and the photosensitive component is located at a side of the hollow enclosure opposite a photoelectron collection component. The photoemitting component may form the hollow enclosure. Additionally, the hollow enclosure may comprise a substantially evacuated space.

Also provided is an apparatus comprising a photoemitter, a photosensor, a photoelectron collector, and a hollow enclosure for housing the photoemitter, the photosensor, the photoelectron collector, or a combination of two or more thereof. The photosensor is in direct contact (or optically direct contact) with the photoemitter, and the photosensor is located at a side of the hollow enclosure opposite a photoelectron collector. The photoemitter may form the hollow enclosure. Additionally, the hollow enclosure may comprise a substantially evacuated space.

In some embodiments, the apparatus further comprises a substrate forming the hollow enclosure. In such embodiments, the substrate may comprise one or more cavities. Further, the photoemitting component may be deposited within the cavities.

In some embodiments, the photoemitting component may further comprise a light guide and a pocket having three surface dimensions. In such embodiments, the photosensitive material may be deposited within the pocket.

In another exemplary embodiment, the photoemitting component comprises a photoemitting gas, an outer surface, and an inner surface. The inner surface comprises a wavelength-shifting material and an optically transparent material, and the photosensitive component is adjacent to the optically transparent material. Such an embodiment may further comprise an electrically insulative material, and in these embodiments the photoelectron collection component may be deposited on the electrically insulative material.

The apparatus may further comprise one or more charge multipliers positioned in the substantially evacuated space between the photosensitive component and the photoelectron collection component.

In some embodiments, the photoelectron collection component may have at least one x-component corresponding to an x-dimension, and at least one y-component corresponding to a y-dimension. For example, the x- and y-components may comprise linear electrically conductive wires. Additionally and/or alternatively, the x- and y-components may comprise one or more electrically conductive pixels.

A method for making the apparatus is also disclosed. The method comprises forming the hollow enclosure positioning the photosensitive component to be in direct contact (or optically direct contact) with the photoemitting component, positioning the photosensitive component at a first distal end within the hollow enclosure, and positioning the photoelectron collection component at a second distal end within the hollow enclosure. In some embodiments, the method further comprises positioning the charge multipliers in the substantially evacuated space between the photosensitive component and the photoelectron collection component.

Also disclosed are methods of using the devices and apparatuses described herein.

Yet another embodiment is a radiation detector, comprising: a photoemitter material configured to produce light upon receiving incident radiation; a photosensitive material in direct contact with the photoemitter material and configured to emit photoelectrons in response to receiving at least a portion of the light produced by the photoemitter material; and a photoelectron collector configured to receive at least some of the photoelectrons emitted by the photosensitive material, wherein the photoelectron collector is separated from the photosensitive material at least in part by an insulator. By way of example in such a radiation detector, the photoemitter material in some cases comprises a scintillator; the photosensitive material in some cases comprises a photocathode; the photoelectron collector in some cases comprises a conductive material; the insulator in some cases comprises air or an inert gas; the photoemitter material and photosensitive material in some cases at least partially surround the photoelectron collector; the photoemitter material and photosensitive material in some cases form at least part of a hollow enclosure containing the photoelectron collector. Optionally, any two or more of these may occur in combination in an embodiment.

One disclosed embodiment concerns a radiation detector comprising a hollow enclosure that includes a scintillator material in direct contact with a photocathode. The photocathode is configured to emit photoelectrons in response to receiving light produced by the scintillator material. A photoelectron collector is positioned within the hollow enclosure that, wherein the photoelectron collector comprises a conductive material that is separated from the photosensitive material at least in part by an insulator.

The foregoing and other objects, features, and advantages of the invention will become more apparent from the following detailed description, which proceeds with reference to the accompanying figures.

DETAILED DESCRIPTION

Figure 1:
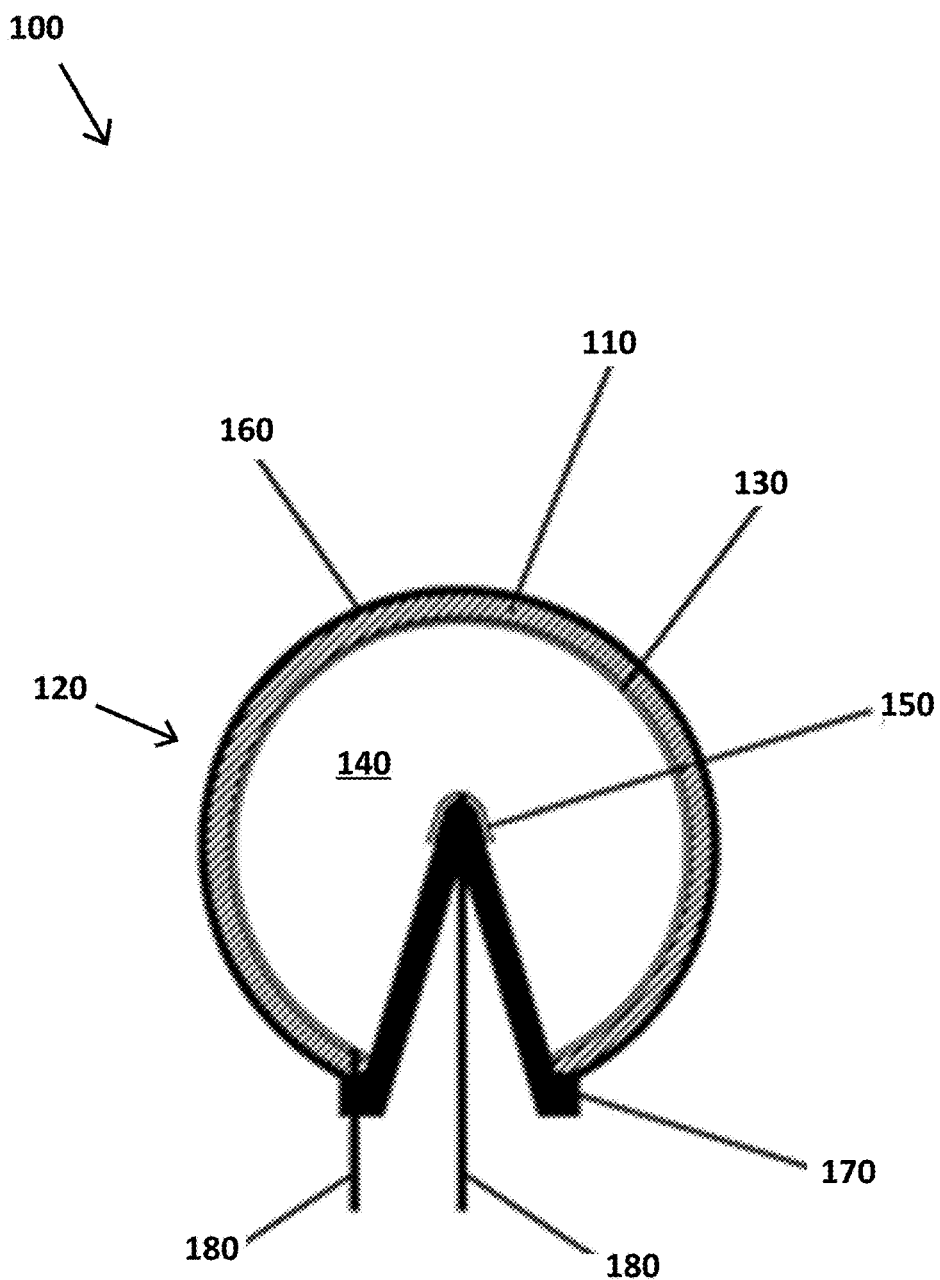
FIG. 1 depicts one embodiment of an apparatus comprising a photosensitive component (e.g., a photosensor) deposited on a photoemitting component (e.g., a photoemitter) that forms a hollow enclosure, and a photoelectron collection component (e.g., a photoelectron collector).

Various embodiments of the present apparatus/device are described below in terms of features, structure, and components, individually and collectively. A person of ordinary skill in the art will recognize that the particular embodiments and uses described herein are exemplary and are not intended to limit the scope of the apparatus or the method for making or using the apparatus or device.

| I. ABBREVIATIONS & DEFINITIONS | |
| --- | --- |
| 3D | three-dimensional |
| BGO | bismuth germanate |
| LBG | lithium-gadolinium-borate |
| MCP | multi-channel plates |
| PMT | photomultiplier tube |
| PSD | pulse-shape discrimination |
| VUV | vacuum ultraviolet |

Activate: To enable a feature, such as scintillation or conduction or detection.

Bulk: Having dimensions roughly proportional to one another. For example, the ratios of the dimensions may range from about 1:1 to about 1:100, such as from 1:2, 1:5, 1:10, 1:20, and/or 1:50.

Cavity: A hole in a surface of a substrate extending from the surface into the substrate, bounded at all sides by the substrate except for an opening at the surface, the opening being substantially parallel to the surface. The size of the hole is small relative to the substrate, having a cross-sectional ratio of, for example, 1:2, 1:5, 1:10, 1:100, 1:1000, or 1:10,000.

Charge: A property of a material and/or subatomic particle that causes the material/subatomic particle to experience a force when placed in an electromagnetic field. Also, a material and/or subatomic particle that experiences a force when placed in an electromagnetic field.

Coupled: The term "coupled" means joined together, either directly or indirectly.

Direct contact: A coupling such that there is no intervening space and/or material. Optically direct contact is a coupling that, while it may include an intervening layer or substance(s) between two surfaces, that intervening layer/substance does not significantly reduce light transmission between the surfaces. Thus, a thin film (such as very thin glass or diamond coating, or a thin optically transparent chemical coating) may provide an insulating (e.g., chemically insulating) layer between two surfaces without significantly inhibiting photo-transmission. Persons of ordinary skill in the art will recognize thin films and thinly appliable substances that are chemically insulating while remaining substantially optically transparent.

Electrically insulative: A property of a material wherein the material has few or no charge carriers (for instance, electrons, holes, ions) available for conduction.

Electromagnetic radiation: Electromagnetic waves that are propagated by simultaneous periodic variations of electric and magnetic field intensity, and that includes radio waves, infrared, visible light, ultraviolet light, X-rays and gamma rays.

Excimer: A bound state of one or more atoms and/or molecules, at least one atom and/or molecule having a completely filled outer valence shell, wherein one or more electrons in the outer valence shell is in an excited energy state having higher energy than a corresponding ground energy state.

Light: Electromagnetic radiation comprising one or more photons having a wavelength ranging from greater than 100 megameters to less than 1 picometer. Some examples include gamma rays (less than 1 picometer to about 10 picometers), X-rays (about 10 picometers to about 10 nanometers), ultraviolet (about 10 nanometers to about 1 micrometer), visible (about 380 nanometers to about 750 nanometers), infrared (about 1 micrometer to about 1 millimeter), and micro waves and radio waves (about 1 millimeter to about 100 kilometers).

Optically transparent: A property of a homogenous or substantially homogenous material wherein the material does not significantly absorb or otherwise attenuate one or more wavelengths of light, such that those wavelengths pass through the material substantially unaffected.

Particle: A microscopic or nanoscopic quantum of material such as an atom and/or molecule.

Photoemitting: Having the property of emitting light; may apply to solid, aqueous, and/or gaseous materials.

Photon: A discreet quantum of electromagnetic radiation.

Photosensitive: Having the property of emitting one or more charged particles upon interacting with one or more photons. For example, a photosensitive material may comprise a photocathode that emits electrons in response to impinging light. As another example, a photosensitive material may comprise molecules having electrons in outer valence shells, wherein the electrons are excited out of the outer valence shells upon absorbing energy from one or more photons.

Pocket: A hole in a surface of a substrate extending from the surface into the substrate, bounded at all sides by the substrate except for an opening at the surface, the opening being substantially parallel to the surface.

Radiation: Various forms of energy, including electromagnetic energy in the form of light, kinetic energy in the form of translational and/or vibrational motion, and/or thermal energy in the form of translational motion, vibrational motion and/or light. Examples include alpha particles, beta particles, and/or neutrons emitted as a result of one or more nuclear reactions, gamma rays, x-rays, infrared light, and/or phonons.

Reflection: The change in direction of a wavefront at an interface between two different media, so that the wavefront or a portion of it returns into the medium from which it originated. Common examples include the reflection of light, sound and water waves. The law of reflection says that for specular reflection the angle at which the wave is incident on the surface equals the angle at which it is reflected.

Reflection of light may occur whenever light travels from a medium of a given refractive index into a medium with a different refractive index. In the most general case, a certain fraction of the light is reflected from the interface, and the remainder is refracted. Total internal reflection of light from a denser medium occurs if the angle of incidence is above the critical angle. Reflection of light is either specular (mirror-like) or diffuse (retaining the energy, but losing the image) depending on the nature of the interface.

The more similar the refraction indices of two materials, the less reflection occurs between them at an interface.

Scintillator: A scintillator is any material that exhibits scintillation, which is luminescence when excited by ionizing radiation. Luminescent materials absorb energy of impinging particles or photons and scintillate, re-emitting some of the absorbed energy as light. Any scintillating material now known or hereafter developed or discovered can be used to practice disclosed embodiments of the present invention.

Sheet: Having dimensions roughly skewed in favor of one or more dimensions over other dimensions. For example, the ratios of the dimensions may range from at least 1:10 to greater than 1:100, such as from 1:50, 1:75, 1:500, and/or 1:1000.

Subatomic particle: A quantum of mass and/or energy of which an atom may be composed, e.g. an electron, neutron, or proton.

Substantially evacuated: Being substantially devoid of unbound, free-moving particles.

Wavelength-shifting: A property of a material wherein the material changes the wavelength of incident light as the light traverses the material, without otherwise altering the light. A wavelength shifter can alter the direction of the light, i.e., the incoming photon direction (ray) may be different from the re-emitted (wavelength-shifted) photon (ray). This is because wavelength shifting is accomplished by absorbing the incoming photon and then isotropically re-emitting light at a (typically longer) wavelength.

II. APPARATUS EMBODIMENTS

FIG. 1 depicts an embodiment of the apparatus disclosed herein. Apparatus 100 includes a photoemitting component 110. The photoemitting component 110 may comprise one or more scintillating materials. Such materials may have the property of interacting with radiation and emitting photons. The scintillating materials may comprise a scintillating glass material having active and passive constituents. Active constituents may interact with impinging radiation to produce photons, whereas passive constituents may be primarily structural. Additionally, the active constituents may have various isotopic concentrations to take advantage of different features. For example, in some embodiments, the isotopic concentration is the naturally-occurring isotopic concentration for a particular active constituent material. Alternatively, desired isotopes can be selected and included at various concentration levels, such as from greater than 0% to 100%, from 10% to 90%, from 20% to 80%, from 30% to 70%, from 40% to 60%, and/or from 45% to 55%. An exemplary embodiment has about 99.99% of a desired isotope. Similarly, the scintillating glass materials may include various concentrations of active constituents from greater than 0% to 100%, such as from 10% to 90%, from 20% to 80%, from 30% to 70%, from 40% to 60%, and/or from 45% to 55%. An exemplary embodiment has about 2.4%, about 6.6%, or about 7.5% concentration of the active constituent.

Specific embodiments of the scintillating glass material include lithium- and/or boron-silicate. The scintillating glass material may also be doped with one or more dopants, such as cerium, Europium and/or chromium. One particular embodiment of the scintillating glass material may comprise, for example, cerium-activated lithium-silicate.

Photoemitting component 110 may form at least a portion of a hollow enclosure 120. Hollow enclosure 120 may have one of several desirable geometries. For example, hollow enclosure 120 may have a geometry that achieves a desired surface-area to volume ratio. Alternatively, hollow enclosure 120 may have a substantially symmetrical geometry. The geometry of hollow enclosure 120 may provide other benefits with respect to other features of apparatus 100, as discussed further below with respect to those features.

A photosensitive component 130 may be positioned on the photoemitting component 110, providing some significant benefits that may not otherwise be realized. For example, the photoemitting component 110 may comprise one or more photoemitting materials having many desirable features, including rapid radiation detection (as compared with other photoemitting materials), photon emission duration that varies for different types of radiation, and strong interaction rates with various types of radiation (as compared with other photoemitting materials). Such desirable photoemitting materials may not be suitable for radiation detection unless the photosensitive component interfaces directly with the desirable photoemitting materials. Thus, apparatus 100 is optimally designed to make use of photoemitting materials having these limitations and desirable features.

Photosensitive component 130 may comprise one or more of various photosensitive materials. For example, photosensitive component 130 may comprise one or more alkali-containing metals, such as antimony-rubidium-cesium and/or antimony-potassium-cesium. Additionally, the photosensitive component 130 may in some embodiments comprise a guard material that acts as a chemical barrier between the photosensitive materials and the photoemitting component 110, preventing the two layers from chemically reacting, but that does not provide a substantial optical barrier. In such embodiments, the guard material can be selected to not attenuate light emitted by the photoemitting component 110. For instance, a thin film guard material may provide chemical insulation without significantly blocking transmissions of or absorbing the scintillator light.

A space 140 between the photosensitive component 130 and a photoelectron collection component 150 may be substantially evacuated. Additionally, the photoelectron collection component 150 may comprise one or more electrically conductive materials such as metals. For example, the charge collection component 150 may comprise silver and/or stainless steel.

Apparatus 100 can be useful in detecting radiation. In particular, this configuration can be useful in detecting one or more thermal neutrons and/or gamma rays. For example, the photoemitting component may interact with radiation, such as thermal neutrons and/or gamma rays, and emit one or more photons. The photons may then interact with the photosensitive component 130. In response to interacting with photons, the photosensitive component may eject one or more charged particles, such as electrons. The photoelectron collection component 150 may collect the charged particles ejected by the photosensitive component 130. It will be understood that photoelectron charge collection can be used to cause a current flow through external circuitry (not shown).

Apparatus 100 may further comprise an optically reflective coating 160 deposited on the photoemitting component 110 outside the hollow enclosure 120. Optically reflective coating 160 may be made of one or more reflective materials, such as metal oxides or metal films such as chromium or silver. For example, the optically reflective coating 160 may comprise aluminum oxide, silver oxide, or combinations thereof.

The optically reflective coating 160, when present, can be useful in reflecting photons that may pass through the photosensitive component 130 without interaction back towards the photosensitive component 130. It will also reflect photons from the scintillator 110 that do not initially travel towards the photosensitive layer 130. This allows for additional reactions between photons and the photosensitive component 130. This feature enhances the efficiency of the apparatus as opposed to an embodiment not including the optically reflective coating 160, because the coating provides a means to redirect more light towards the photosensitive component and therefore provide additional capture efficiency. For example, including an optically reflective coating in the apparatus may result in a range of photons interacting with the photosensitive component 130 from greater than 0% of photons emitted by the photoemitting component 110 to 100%, such as from 10% to 90%, from 20% to 80%, from 30% to 70%, from 40% to 60%, and/or from 45% to 55%.

Hollow enclosure 120 may be at least partially formed by an insulating component 170, though this is not essential—for instance, in those embodiments where the scintillator itself is an electric insulator (e.g., scintillating glass). There is thus no essential requirement that insulating component 170 be of a different material. Insulating component 170 may protrude into the space 140. The photoelectron collection component 150 may be deposited on the insulating component 170. Insulating component 170 may comprise one or more materials that inhibit electrical conduction, such as glass materials. For example, in one embodiment, the insulating component 170 comprises a glass ceramic plate.

One exemplary embodiment of the apparatus 100 includes the hollow enclosure 120 forming a sphere with an inward protrusion. The inward protrusion is formed by the insulating component 170, where an apex of the inward protrusion is positioned at about the center of the sphere. The voltage collection component 150 can be deposited on the insulating component 170 adjacent to the apex such that the shortest distance between a particular portion of the photosensitive component 110 and the voltage collection component 150 is roughly equal for each portion of the photosensitive component 110. Furthermore, one or more voltage biasing wires 180 may be coupled to the photosensitive component 130, the voltage collection component 150, or both. A negative voltage bias may be applied by the charge biasing wires 180 to the photosensitive component 110 and/or a positive voltage bias may be applied by the voltage biasing wires 180 to the photoelectron or voltage collection component 170.

Another exemplary embodiment of the apparatus 100 includes the hollow enclosure 120 forming a planar envelope. The insulating component 170 may be deposited along two dimensions of a planar surface of the planar envelope, separated from the photosensitive component 130 by the space 140. This geometry provides many benefits similar to those of the spherical geometry, with an added benefit of compact design as the sphere has the lowest ratio volume to surface. Alternative geometries are also envisioned, which enable a high surface to volume ratio, such as pancake or ovoid designs.

Apparatus 100 can be useful in identifying different forms of radiation. The duration of an interaction between the photoemitting component 110 and radiation can be very precisely calculated because the path of any ejected charged particle between the photosensitive component 110 and the photoelectron collection component 170 is roughly equal. This duration can be compared to known experimental and theoretical pulse shapes (determined by the scintillator used for detection) for one or more radiation forms. For each scintillator there is a different and distinct shape of the current of the resultant light pulse. Additionally, because of its precision, the apparatus 100 may be used to more precisely characterize the pulse shape of various radiation forms as compared with other radiation detectors not having the same features.

Figure 2:
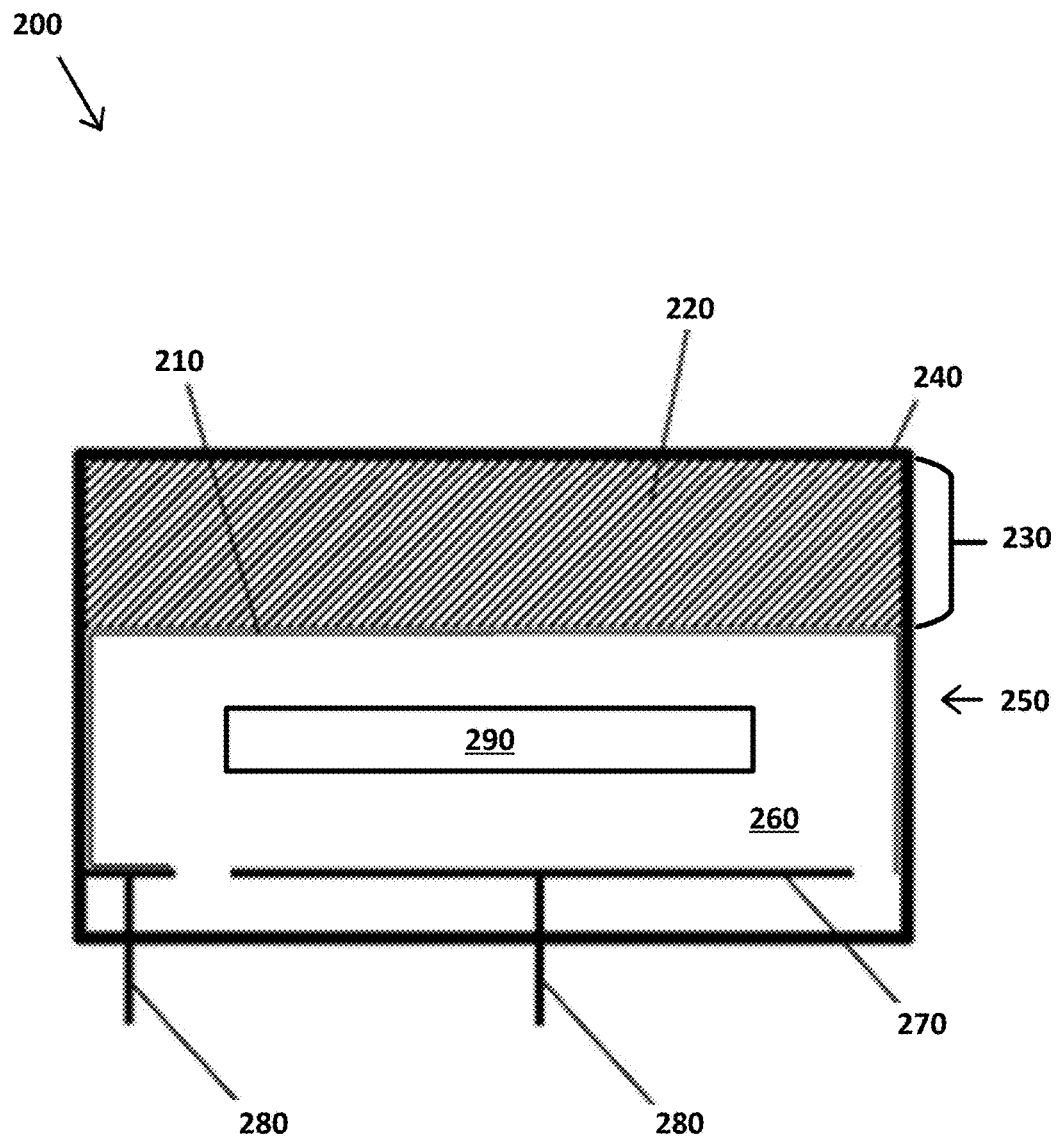
FIG. 2 depicts an apparatus embodiment comprising a bulk photoemitting material positioned in a hollow enclosure.

FIG. 2 depicts another exemplary embodiment of the disclosed apparatus. A photosensitive component 210 is deposited on a photoemitting component 220. The photoemitting component 210 may have a thickness 230 optimized for one or more various radiation forms, where optimized means that radiation interaction and photon emission have equally desirable magnitudes. For example, the photoemitting component 220 may interact with a range of impinging radiation from greater than 0% to 100%, such as from 10% to 90%, from 20% to 80%, from 30% to 70%, from 40% to 60%, and/or from 45% to 55%. The photoemitting component 220 may, as a result of interacting with impinging radiation, emit a range of photons from greater than 0 to 125,000 photons per mega electron Volt of radiation energy, such as from 10,000 to 110,000 photons per mega electron Volt, from 20,000 to 100,000 photons per mega electron Volt, from 30,000 to 90,000 photons per mega electron Volt, 40,000 to 80,000 photons per mega electron Volt, 50,000 to 70,000 photons per mega electron Volt, and/or from 55,000 to 65,000 photons per mega electron Volt.

Similar to photoemitting component 110, photoemitting component 220 may comprise one or more scintillating materials, such as scintillating glass and/or crystal materials. For example, photoemitting component 220 may comprise one or more scintillating glass materials similar to those described above with respect to photoemitting component 110. Additionally and/or alternatively, photoemitting component 220 may comprise one or more scintillating crystal materials, such as lithium calcium aluminum fluoride (LiCAF), lithium-gadolinium-borate (LGB), and/or cesium lithium yttrium chloride (CLYC). These materials may further be doped with one or more dopants, such as cerium and/or chromium. In one particular embodiment, the photoemitting component 220 comprises cerium-doped LiCAF. Another particular embodiment of photoemitting component 220 comprises cerium-doped CLYC.

Photoemitting component 220 may comprise one or more composite materials comprising glass, crystal, and/or polymeric materials. For example, the composite materials may comprise one or more plastics with mixed-in scintillating crystal grains. Photoemitting component 220 may also have various geometric and dimensional properties. For example, in one embodiment, the photoemitting component 220 is a bulk rectangle. In other embodiments, the photoemitting component 220 comprises one or more layers of composite scintillating sheets.

Photosensitive component 210 may also be at least partially deposited on a substrate 240, which forms a hollow enclosure 250 having a space 260 that is substantially evacuated. The substrate 240 may be formed of various materials depending on features desired of the substrate 240. In some embodiments, substrate 240 is optically reflective. Substrate 240 may comprise one or more metallic materials with reflective properties. For example, the substrate 240 may comprise alumina ceramic, stainless steel, glass or a combination of two or more thereof; in certain embodiments, this is a structural feature that need not be transparent. Such materials may enable increases in efficiency of photoelectron capture by the device, similar to the optically reflective coating 160 described above with respect to apparatus 100.

In other embodiments, the substrate 240 comprises one or more optically transparent materials, such as glass materials. For example, the substrate 240 may comprise borosilicate glass and/or quartz glass.

The hollow enclosure 250 may have any geometry desired for a particular application. In some embodiments, the hollow enclosure 250 comprises a shape that matches the contours of the photoemitting component 220. For example, the hollow enclosure 250 may have rectangular, hexagonal, or cylindrical geometry, or combinations thereof.

A particular advantage of the substrate 240 may be in protecting the integrity of the space 260. The space 260 may be threatened by invading gases, such as helium molecules. These gases may interfere with the detection capabilities of the apparatus 200 by creating static noise that can result in an output signal by the apparatus 200 even when no actual radiation is being detected. Some substrate 240 materials may not be impermeable to such gases. Thus, in at least some embodiments, it may be desirable to include substrate 240 materials impermeable to such gases to substantially eliminate these undesirable effects. Substrate 240 may also provide additional benefits, such as reducing manufacturing cost and/or increasing the apparatus's 200 durability. Such a configuration may be especially desirable in harsh environmental conditions and/or applications.

It may not be possible in some embodiments to maintain the space 260 perfectly devoid of unbound, free-moving particles. Thus, it may be beneficial to include within the space 260 a reactive removal material that removes invading particles from the space 260.

A photoelectron collection component 270 may be positioned in the hollow enclosure 250 such that the vacuum space 260 is disposed between the photoemitting component 220 and the photoelectron collection component 270. One or more charge carrier wires 280 may be coupled to the photoelectron collection component 250, the photosensitive component 210, or both. Charge carrier wires 280 may conduct signals from the photoelectron collection component 270 that correspond to radiation interactions at the photoemitting component 220. The signals may be transmitted to, for example, user electronics for reading, storing, and otherwise disposing of information related to the signals in any way an apparatus 200 user may desire.

Apparatus 200 may also include a charge multiplication component 290 positioned in the space 260. The charge multiplication component 290 may intercept charged particles ejected by the photosensitive component 210. In response, the charge multiplication component 290 may eject proportionally more charged particles. The charge multiplication component 290 may thereby multiply the number of photosensitive component 210-ejected charged particles by a factor greater than 1. For example, in some exemplary embodiments, the charge multiplication component 290 multiplication factor is one million.

Charge multiplication component 290 may comprise one or more metallic alloys, such as copper beryllium. In other embodiments, such desired materials comprise one or more multialkali compounds deposited on stainless steel, such as magnesium oxide, beryllium oxide, gallium phosphide doped with cerium, or combinations thereof. Similarly, charge multiplication component 290 may comprise one or more structures, such as venetian blinds, metal channels, and/or multi-channel plates.

Figure 3:
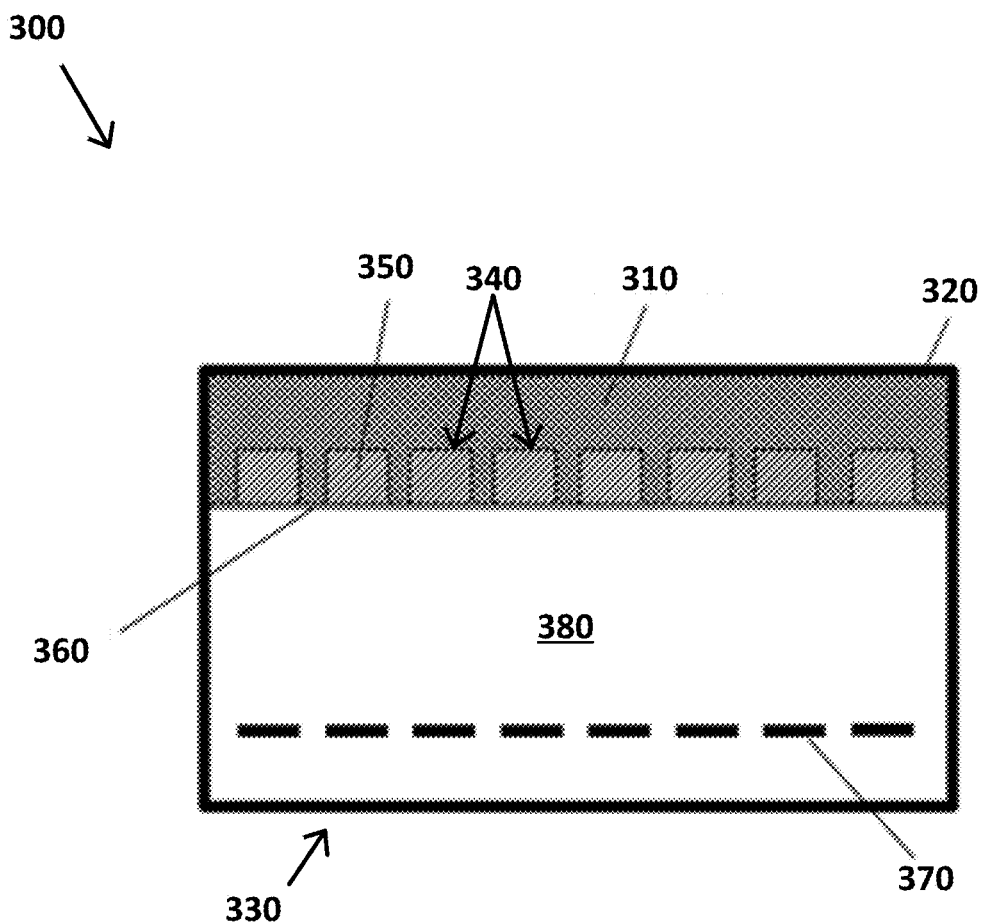
FIG. 3 depicts an apparatus embodiment wherein the photoemitting component is positioned in cavities of a substrate.

FIG. 3 depicts another apparatus embodiment. A substrate 310 is deposited within a housing 320 which forms a hollow enclosure 330. Substrate 310 comprises one or more cavities 340. A photoemitting component 350 may be deposited within cavities 340 such that the photoemitting component 350 is adjacent to substrate 310. Similar to other apparatus embodiments, photoemitting component 350 may emit photons in response to interacting with radiation. It may therefore be beneficial for the substrate 310 to be optically reflective to reflect light emitted by the photoemitting component 350.

Cavities 340 may be formed in substantially one dimension along an inside surface of substrate 310, or cavities 340 may be formed in substantially two dimensions across the inside surface of substrate 310. Additionally, cavities 340 may help improve radiation detector signal and/or performance quality by shielding each portion of the photoemitting component 350 from Compton electrons formed in each other portion of the photoemitting component 350.

Photosensitive component 360 may be deposited on the photoemitting component 350 over an open end of the cavities 340. Additionally, a photoelectron collection component 370 may be positioned inside the hollow enclosure 330, and a space 380 may be positioned between the photoelectron collection component 370 and the photosensitive component 360, the space 380 being substantially evacuated.

The photoelectron collection component 370 may have at least one x-component corresponding to an x-dimension, and at least one y-component corresponding to a y-dimension. For example, the x- and y-components may comprise linear electrically conductive wires or one or more electrically conductive pixels. Such a configuration is useful for making the photoelectron collection component 370 position-sensitive.

Figure 4:
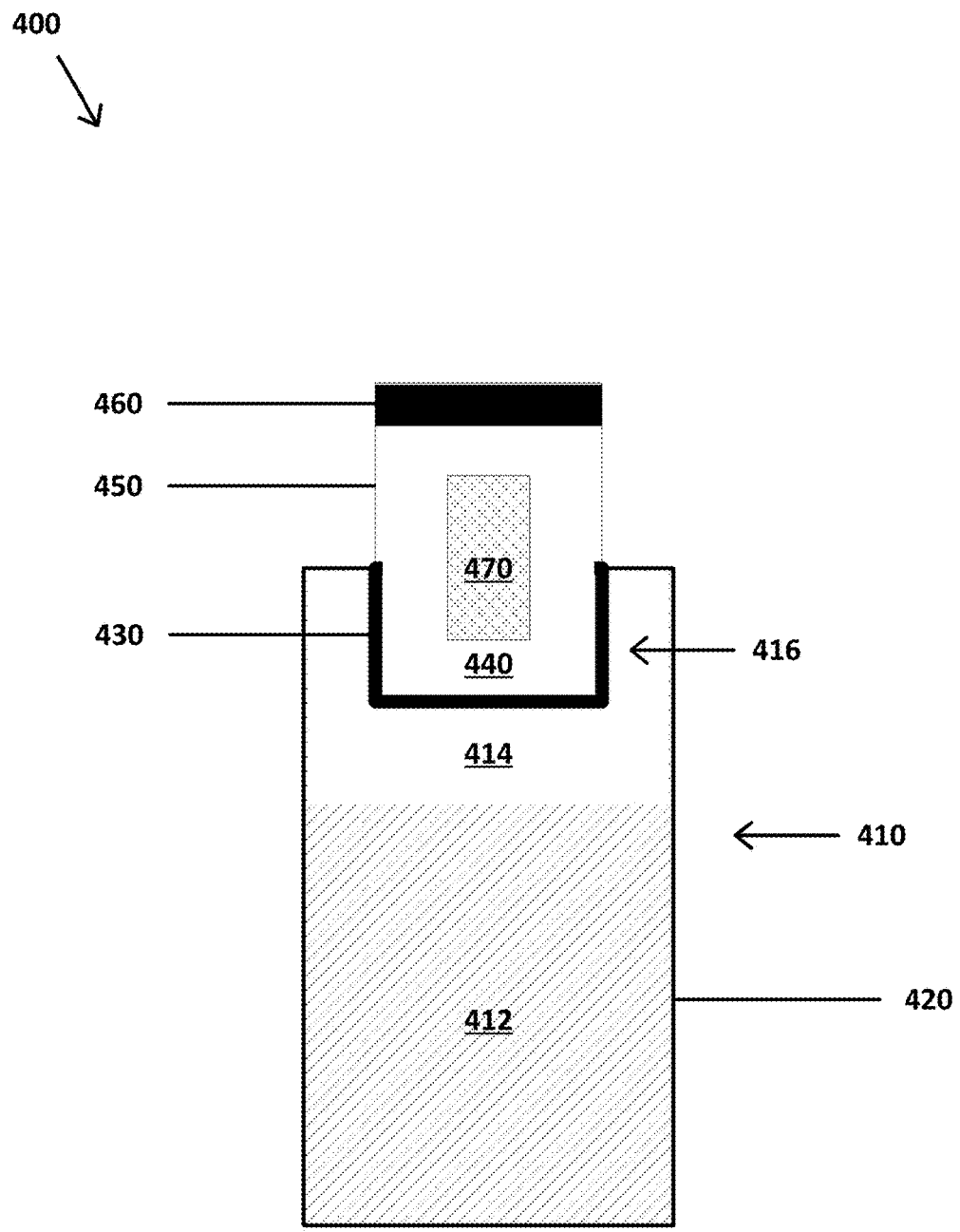
FIG. 4 depicts an apparatus embodiment wherein the photoemitting component has a pocket.

FIG. 4 depicts another apparatus embodiment 400. A photoemitting component 410 comprises a scintillating material 412, a light guide 414, and a pocket 416. The scintillating material may comprise any of the materials disclosed above with respect to other apparatus embodiments. Additionally, the scintillating material may comprise a liquid scintillating material. The photoemitting component 410 may be surrounded by an optically reflective material 420, which may serve to reflect light emitted by the photoemitting component 410, but may also serve to contain the scintillating liquid in embodiments that include such.

The light guide 414 may transmit light emitted by the photoemitting component 410 to one or more other components of the apparatus 400 without substantially degrading the quality of the light and/or attenuating the intensity of the light.

The pocket 416 may have three surface dimensions; in alternative embodiments, it is substantially cylindrical and therefore includes essentially two dimensions (the circular side of the cylinder and its circular face). A photosensitive component 430 may be deposited on the pocket 416 along each of the surface dimensions. A space 440 may be housed by a vacuum tube 450 that extends from the pocket 416, wherein the space 440 is substantially evacuated. A photoelectron collection component 460 may be positioned at one end of the vacuum tube 450, wherein the space 440 is positioned between the photosensitive component 430 and photoelectron collection component 460. Optionally, a charge multiplication component 470 may be positioned in the space 440.

Figure 5:
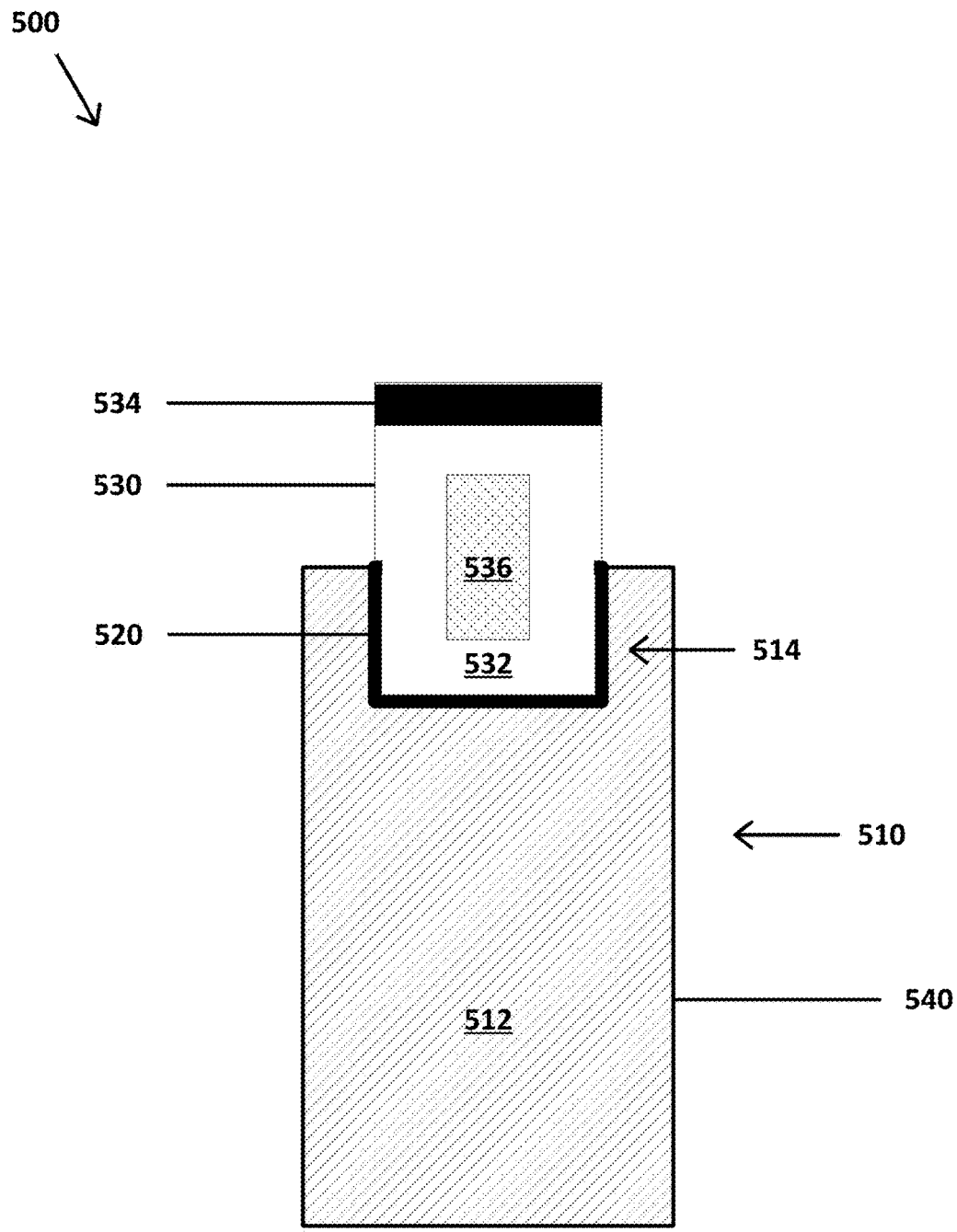
FIG. 5 depicts and another apparatus embodiment wherein the photoemitting component has a pocket.

FIG. 5 depicts an alternative apparatus embodiment 500 similar to apparatus 400, but omitting a structure analogous to the light guide 414. A photoemitting component 510 comprises a scintillating material 512 and a pocket 514. The pocket 514 has three surface dimensions, and a photosensitive component 520 is deposited on the pocket 514 along each of the three surface dimensions. A vacuum tube 530 comprising a space 532 that is substantially evacuated, a photoelectron collection component 534, and a charge multiplication component 536 extend from the pocket 514. Additionally, an optically reflective coating 540 may surround the photoemitting component 510.

Figure 6:
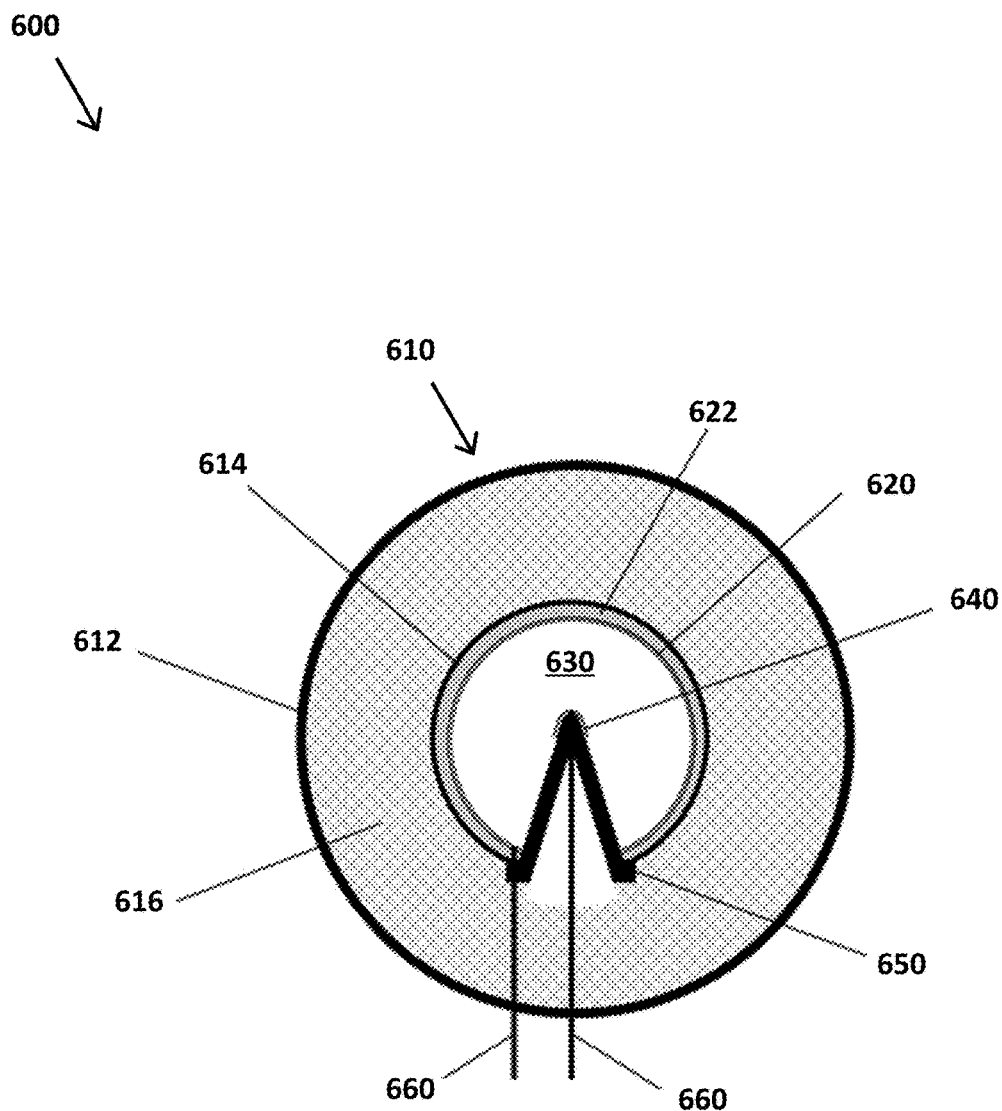
FIG. 6 depicts an apparatus embodiment wherein the photoemitting component comprises a scintillating gas.

FIG. 6 depicts another apparatus embodiment 600. A photoemitting component 610 comprises an outer surface 612, an inner surface 614, and a scintillating gas 616. Furthermore, the inner surface 614 may comprise an optically transparent material 616 and a wavelength-shifting material 618. In an exemplary embodiment, the photoemitting component 610 is hollow and substantially spherical. The outer and/or inner surfaces 612, 614 may comprise one or more materials having high pressure resistance. For example, in some embodiments, the outer and/or inner surfaces 612, 614 may be configured to withstand up to about 100 atmospheres. Additionally, the outer and/or inner surfaces 612, 614 may comprise one or more materials having such high pressure resistance, even with relatively small thickness-to-surface area ratios, such as from about 0.01% to about 1%. For example, the outer and/or inner surfaces 612, 614 may comprise quartz, fused silica, or both.

In some embodiments, it may be beneficial for the outer surface 612 and inner surface 614 to have different beneficial features. For example, in some embodiments, it may be beneficial for the outer surface 612 to be optically reflective and the inner surface 614 to be optically transparent. The outer surface 612 may comprise an optically reflective material, or may be coated with an optically reflective material. The inner surface 614 may be optically transparent to substantially all light, or selectively transparent. For example, the inner surface 614 may be transparent to light in the visible and ultraviolet spectrums, but opaque to light in the infrared spectrum. Specifically, it can be beneficial for the inner surface 614 to be transparent to photons emitted by the scintillating gas 616. In one such embodiment, the inner surface 614 is transparent to at least wavelengths of light between about 100 nanometers and 350 nanometers.

The scintillating gas 616 may comprise one or more materials that form one or more excimers when interacting with radiation. The excimers may decay, emitting one or more photons. A photosensitive component 620 is deposited on the inner surface 614 to receive photons emitted by the scintillating gas 616.

The photoemitting component 610 may have a volume feature, and the photosensitive component 620 may have a surface area feature. The magnitude of the volume and/or surface area features can be selected based on a desired volume-to-surface area ratio. In general, increasing the volume feature by increasing the size of the outside surface 612 can increase the likelihood of a scintillating gas 616-radiation interaction. Similarly, increasing the surface area feature can increase the likelihood of a photosensitive component 620-photon interaction. However, increasing the volume feature too much may result in the photoemitting component 610 structure being too fragile for practical use, and increasing the surface area feature may decrease the volume feature. Thus, there can be a desirable volume-surface area ratio that enables a sufficient number of scintillating gas-radiation interactions and a sufficient number of photosensitive component 620-photon interactions.

The photosensitive component 620 may, in some embodiments, comprise a wavelength-shifting layer 622 useful for shifting the wavelength of photons emitted by the photoemitting component 610 to wavelengths that more readily interact with the photosensitive component 620.

A space 630 is positioned between a photoelectron collection component 640 and the photosensitive component 620. In some embodiments, an insulating material 650 protrudes into the space 630, and the photoelectron collection component 640 may be deposited on the insulating material. Additionally, the apparatus may include one or more charge carrier wires 660 coupled to the photosensitive component 620, the photoelectron collection component 640, or both.

Any of the devices/apparatuses described herein may be used in conjunction with other detection electronics, such as one or more signal detectors coupled to the photosensitive component, the charge or voltage multiplication component, and/or the photoelectron collection component. Such detection electronics may perform one or more useful functions. For example, the detection electronics may supply a biasing voltage to the photosensitive component, charge multiplication component, and/or the photoelectron collection component. The biasing voltage may help make more electrons available for emission from the photosensitive component by applying a negatively-charged bias to the photosensitive component. Similarly, the biasing voltage may help in collecting charge by applying a positively-charged bias to the photoelectron collection component. The biasing voltage may also help amplify the signal produced by the apparatus by applying a voltage across the charge multiplication component that makes more electrons available for collection than would otherwise be available.

The detection electronics may also be useful in providing information to a user. For example, the detection electronics may comprise one or more user interfaces. The user interfaces may comprise a display, input components, or both. For example, the user interface may comprise a display that outputs numerical and other values corresponding to signals produced by the apparatus. Input components, such as a graphical user interface, may allow a user to manipulate data corresponding to signals produced by the apparatus. A specific example of a user interface includes a computer having a user display, a graphical user interface, one or more processors, and memory.

III. SCINTILLATING MATERIALS

It is contemplated that any scintillator materials can be used with the devices described herein. Exemplary classes of scintillating materials useful for practicing disclosed embodiments of the present invention are discussed below.

Inorganic scintillators are usually crystals grown in high temperature furnaces. Alkali metal halides and doped alkali metal halides are one example of a genus of materials useful as inorganic scintillating materials. One common example is NaI(Tl) (sodium iodide doped with thallium). Other exemplary inorganic alkali halide crystals include: CsI(Tl), CsI(Na), CsI(pure), CsF, KI(Tl), LiI(Eu). Some non-alkali crystals include: $BaF_2$, $CaF_2$(Eu), ZnS(Ag), $CaWO_4$, $CdWO_4$, YAG(Ce) ($Y_3Al_5O_{12}$(Ce)), GSO, LSO. Newly developed products include $LaCl_3$(Ce), lanthanum chloride doped with Cerium, as well as a Cerium-doped lanthanum bromide, $LaBr_3$(Ce). Both provide excellent light output and energy resolution (63 photons/keV γ for $LaBr_3$(Ce) versus 38 photons/keV γ for NaI(Tl)), a fast response (16 ns for $LaBr_3$(Ce) versus 230 ns for NaI(Tl)), excellent linearity, and a very stable light output over a wide range of temperatures. In addition $LaBr_3$(Ce) offers a higher stopping power for γ rays (density of 5.08 g/cm$^3$ versus 3.67 g/cm$^3$ for NaI(Tl). LYSO ($Lu_{1.8}Y_{0.2}SiO_5$(Ce)) has an even higher density (7.1 g/cm$^3$, comparable to BGO), is non-hygroscopic, and has a higher light output than BGO (32 photons/keV γ), in addition to being rather fast (41 ns decay time versus 300 ns for BGO).

The most common glass scintillators are cerium-activated lithium or boron silicates. Since both lithium and boron have large neutron cross-sections, glass detectors are particularly well suited to detecting thermal (slow) neutrons. Lithium is more widely used than boron since it has a greater energy release on capturing a neutron and therefore greater light output. Glass scintillators are, however, sensitive to electrons and γ rays as well (pulse height discrimination can be used for particle identification). Being very robust, they are also well-suited to harsh environmental conditions. Their response time is ≈10 ns, their light output is however low, typically ≈30% of that of anthracene.

Organic scintillators (fluors) typically are aromatic hydrocarbon compounds that contain benzene ring structures. Their luminescence typically decays within a few nanoseconds. Some organic scintillators are pure crystals. The most common types are anthracene ($C_{14}H_{10}$, decay time ≈30 ns), stilbene ($C_{14}H_{12}$, 4.5 ns decay time), and naphthalene ($C_{10}H_8$, few ns decay time). They are very durable, but their response is anisotropic, which spoils energy resolution when the source is not collimated. Anthracene has the highest light output of all organic materials. Organic scintillators also cannot be easily machined, nor can they be grown in large sizes.

Plastic scintillators typically are scintillating materials suspended in a solid polymer matrix. This combination is typically made by dissolving an "organic scintillator" in polymer forming reagents prior to bulk polymerization. The organic scintillator is sometimes associated with the polymer directly, either covalently or through coordination, as is the case with many Li6 plastic scintillators. Polyethylene naphthalate has been found to exhibit scintillation by itself without any additives. The advantages of plastic scintillators include fairly high light output and a relatively quick signal, with a decay time of 2-4 nanoseconds. Perhaps the biggest advantage of plastic scintillators is their ability to be shaped into almost any desired form.

Aromatic polymers also can be useful scintillating materials. Typically these polymers include pendent aromatic rings along a polymer backbone. Examples include polyvinyltoluene (PVT) and polystyrene (PS). While the polymer does fluoresce in the presence of ionizing radiation, it often exhibits low yield and negligible transparency to its own emission making the use of organic scintillators in combination suitable for making a scintillator.

Exemplary fluors (organic scintillators) include polyphenyl hydrocarbons, oxazole and oxadiazole aryls, especially, n-terphenyl (PPP), 2,5-diphenyloxazole (PPO), 1,4-di-(5-phenyl-2-oxazolyl)-benzene (POPOP), 2-phenyl-5-(4-biphenylyl)-1,3,4-oxadiazole (PBD), and 2-(4'-tert-butylphenyl)-5-(4"-biphenylyl)-1,3,4-oxadiazole (B-PBD). Aside from the aromatic plastics, another common polymeric material used to make scintillating materials is polymethylmethacrylate (PMMA). PMMA has high ultraviolet and visible light transparency, and has suitable mechanical properties. The lack of fluorescence associated with PMMA is often compensated by adding an aromatic co-solvent, such as naphthalene. Other common polymeric materials include polyvinyl xylene (PVX) polymethyl, 2,4-dimethyl, 2,4,5-trimethyl styrenes, polyvinyl diphenyl, polyvinyl naphthalene, polyvinyl tetrahydronaphthalene, and copolymers thereof.

Some scintillators, such as cerium-doped LiCAF, emit light at ultraviolet wavelengths. In traditional detectors, where a glass interface is present between the scintillator and the photosensitive component, some of that light emitted by such scintillators is absorbed by the glass. This causes a loss of useful light and thus degrades the performance of the scintillator. Removing this glass interface and bringing the photosensitive component in direct contact with the scintillator (as describe herein) eliminates this loss and thus enhances the detector performance relative to traditional detectors. Other dopants can likewise be exploited in the devices and methods described herein, including cerium (e.g., Ce), Europium (e.g., $Eu^{2+}$), sodium/Europium mixtures (e.g., $Eu^{2+}$; Nat), or new dopants such as neodymium (e.g., $Nd^{3+}$), and erbium (e.g., $Er^{3+}$) with light emission in far UV. The properties of these scintillators are not yet well studied due to absence of practical far UV light readout technology.

IV. METHODS OF MAKING

A method for making the apparatus disclosed above comprises forming the hollow enclosure comprising the substantially evacuated space. This may be accomplished by, for example, traditional glass-blowing techniques and/or traditional vacuum-chamber manufacturing techniques. The method further comprises positioning the photosensitive component to be in direct contact with the photoemitting component and positioning the photosensitive component at the first distal end within the hollow enclosure. For example, the method may comprise depositing the photosensitive component directly on the photoemitting component. Conventional deposition methods, such as chemical vapor deposition and/or physical vapor deposition, may be employed to accomplish this step. Alternatively, the method may comprise growing or otherwise forming the photosensitive component on another substrate and transferring the photosensitive component to the photoemitting component such that the two components are in direct contact. Finally, the method comprises positioning a photoelectron collection component at the second distal end within the hollow enclosure. The method may optionally comprise positioning a charge multiplication device in the substantially evacuated space between the photosensitive component and the photoelectron collection component.

V. METHODS OF USING

Method for using the apparatuses described herein are also now enabled.

An exemplary embodiment of a method for using the apparatus comprises providing an apparatus and using the apparatus for a particular purpose. For example, the method may comprise positioning an apparatus and a radiation source sufficiently adjacent to each other for the apparatus to detect radiation emitted by the radiation source. These embodiments can be useful for identifying, quantifying, and/or mapping sources of radiation.

Some of the embodiments employ a signal detector having a user interface. Using the apparatus may comprise reading one or more electrical signal values from the signal detector user interface. In embodiments where the user interface can accept user input, using the apparatus in certain examples further comprises entering instructions into the signal detector using the user interface. The instructions for instance may correspond to one or more signal detector operations performed by the signal detector.

The detectors described here can be used with amplifiers and multichannel analyzers for instance to produce a spectrum of gamma rays. This spectrum would be analyzed to determine the amount of detected radiation coming from different sources ($^{235}$U, $^{239}$Pu, $^{137}$Cs etc.). These values give information on the type and quantity of radioactive materials in the item of interest.

The currently described detectors enable the use of scintillators with higher light output and/or create more photoelectrons giving spectra with better resolution (better separation of peaks from different radionuclides), leading to more accurate measurements.

When these detectors are used for combined neutron and gamma detection, the greater number of photoelectrons will give better performance of techniques to distinguish between neutron and gammas based on their respective pulse shapes.

These measurements are important for applications such as health physics, nuclear waste measurement, nuclear emergency response and nuclear material accountancy, for example.

VI. EXAMPLES

The examples below show, among other features of the apparatus, the application of the photocathode directly to the bulk scintillator material. In such a geometry, the scintillation light emitted inside the scintillator propagates through the scintillator material and encounters the photocathode immediately at the surface of the scintillator material. Five examples demonstrating this feature are described below.

Example 1

One example embodiment comprises a non-planar hollow enclosure, or envelope, made from a scintillating glass (FIG. 1). A photocathode is applied directly to an inside surface of the scintillating envelope, the inside surface being the side of the envelope that faces the anode electrode. An external optical reflector layer is applied to the outside of the scintillating glass envelope. Photo-electrons can be produced in the photocathode and collected at an anode from which an electrical signal can be read out. The scintillating envelope can be made, for example, from commercial GS20 neutron scintillator glass. Incoming radiation, such as thermal neutrons, can interact with and create scintillation light within the scintillating glass envelope. The scintillation light may encounter the photocathode at the inside surface of the scintillating glass envelope, and part of the scintillation light may be absorbed and converted to photo-electrons that propagate to the anode. Scintillation light that is not absorbed by the photocathode may propagate through an inside volume of the envelope, which is substantially evacuated, and encounter the photocathode again at another location with another opportunity to be absorbed and converted to photo-electrons. Some scintillation light may again pass through the photocathode, and subsequently be reflected back into the inside volume by the external optical reflector layer. Multiple interactions of the scintillation light with the photocathode may be possible, thereby increasing the probability for the scintillation light to be absorbed and converted to photo-electrons over devices not including the external optical reflector layer and other features of the example. This improved light to photo-electron conversion efficiency produces a larger electrical signal per (neutron or gamma) interaction event and thereby improves the performance (e.g. energy resolution) of the detector over devices not including the external optical reflector layer and other features of the example. In conventional devices having photocathodes deposited on planar, non-scintillating surfaces where multiple interactions of the scintillation light with the photocathode are possible, the thickness of the photocathode is often optimized for a single interaction with the scintillation light. In this example, the optimum photocathode layer is thinner.

This example comprises a spherical scintillating glass envelope and photocathode in which the path length to the anode for the photo-electrons produced in the photocathode substantially equivalent for any position on the photocathode. Compared to, for example, a planar photocathode, this offers improved timing characteristics. The envelope and/or photocathode can have shapes other than spherical. For example, the scintillating glass envelope could be planar with the photocathode applied to the inside surface. Furthermore, an envelope could be made from materials other than scintillating glass. For example, scintillating crystal sheets or shapes made from composite scintillator materials could be used to fabricate the envelope to which the photocathode is then directly applied to an inside surface.

Example 2

FIG. 2 shows a second example in which a photocathode is directly applied to a scintillating bulk material placed inside an envelope. In this example, the envelope, which is optically reflecting, is itself not scintillating, rather the scintillating bulk material is directly placed inside a volume created by the envelope. As with other examples, the scintillating bulk material can be a glass, crystal, or composite material. One of the advantages of this embodiment is that the direct application of the photocathode to the scintillator surface eliminates the need for an optical window and losses from the scintillation light path due to the optical window, as occurs in many other radiation detection devices. This example is therefore particularly suited to enable the use of UV-emitting scintillators that cannot be used in traditional photomultiplier tube and (PMT) scintillator devices. For example, $Ce^{3+}$-doped $LiCaAlF_6$ (LiCAF:Ce) crystal scintillator has very attractive neutron detection properties, such as fast light response with pulse-shape discrimination (PSD) and very high neutron light yield, that allow for the distinction of neutron-induced and gamma-induced interactions. However, it emits scintillation light having a wavelength of about 280 nm. This short-wavelength scintillation light of LiCAF:Ce can be significantly attenuated in traditional PMT glass windows, limiting its use. The present example eliminates this loss, taking advantage of the attractive scintillation properties of LiCAF:Ce. Other dopants can likewise be exploited in the devices and methods described herein, including cerium (e.g., Ce), Europium (e.g., $Eu^{2+}$), sodium/Europium mixtures (e.g., $Eu^{2+}$; $Na^+$), or new dopants such as neodymium (e.g., $Nd^{3+}$), and erbium (e.g., $Er^{3+}$) with light emission in far UV. The properties of these scintillators are not yet well studied due to absence of practical far UV light readout technology.

The present example could be further enhanced by the addition of photo-electron multiplier structures such as Venetian blinds, metal channels, or multi-channel plates (MCP) that are known in the art and that can be placed in a space between the photocathode and an anode within the envelope.

Optionally, a metal enclosure can be used for the envelope to simplify the manufacturing process and increase the ruggedness of the device.

Example 3

Another example comprises the application of a photocathode directly to a pixelated scintillator structure (FIG. 3). This configuration enables imaging capabilities. A two-dimensional array of scintillating pixels is embedded in a metal substrate matrix, and a photocathode is applied directly to an exposed scintillator surface. Scintillation light created in the scintillating material inside the scintillating pixels propagate to the photocathode either on a direct path or via reflection by the metal substrate matrix. The scintillation light may be absorbed by the photocathode, and resulting photo-electrons may be accelerated towards an anode where they can be read out as an electrical signal. The example could be further enhanced by the addition of electron-multiplier structures such as Venetian blinds, metal channels, or MCPs that are known in the art and that could be placed in a space between the photocathode and the anode within the envelope. An image can then be constructed from the signals obtained from the individual scintillator pixels. Additionally, the anode can either be pixelated or consist of x-y electrodes (wires, strips) to allow for position-sensitive readout.

This example can be configured as a thermal neutron imaging detector. The imaging detector consists of (1) a substrate that provides pockets for the pixels and (2) scintillating material inside the pockets. The substrate may have three functions: (1) it can be a mechanical structure that defines and separates the pixels, (2) it can be a light reflector that confines the scintillation light generated in the pixels and returns it back to the photocathode, and (3) it can be a shield that prevents Compton electrons produced by gamma-ray interactions in one pixel from reaching other pixels. The substrate is made from an optically reflective metal. The pockets are arranged as an array in a plane such as to form an array of pixels for imaging. The scintillating material placed inside the pockets could be made, for example, from commercial GS20 scintillating glass, from a LiCAF:Ce crystal, or Lithium-Gadolinium-Borate scintillators (LBG). The anode is pixelated and/or consists of x-y electrodes (wires, strips) to allow for position-sensitive readout. The example could be further enhanced by the addition of electron-multiplier structures such as Venetian blinds, metal channels, or multi-channel plates (MCP) that are known in the art and that would be placed in the space between the photocathode and the position-sensitive anode.

Optionally, a metal enclosure could be used for the envelope to simplify the manufacturing process and increase the ruggedness of the device.

Example 4

Another example (FIG. 4) comprises a scintillation radiation detector that uses a PMT with a three-dimensional (3D) photocathode, a bulk scintillator optionally attached to a non-scintillating light guide (called the scintillator assembly), and a reflector layer applied to the scintillator assembly. The PMT having a 3D photocathode is embedded into the scintillator assembly, potentially realizing two advantages: (1) an active photocathode area is greater than a face-to-face optical coupling, as with traditional PMT devices, resulting in improved scintillation light to photo-electron conversion efficiency and thus improved detector performance; (2) the embedded 3D photocathode offers the possibility of multiple light/photocathode interactions and thus additionally improved conversion efficiency. The combination of these effects can increase the efficiency of conversion of scintillation light to photo-electrons and therefore improves the overall performance of the detector. Similar benefits can be realized without the optional non-scintillating light guide (FIG. 5). The scintillator a solid scintillator (e.g. a plastic scintillator) or a liquid scintillator.

Example 5

A class of radiation detectors utilizes a high-pressure gas as the scintillating medium. Upon an interaction with a gamma-ray or neutron, the gas molecules are excited and form an excimer that subsequently decays to the ground state by emission of an optical photon in the vacuum ultraviolet (VUV) range. Typical excimer emissions are in the 120-300 nm range. In traditional geometries, the gas is contained in a high-pressure gas cell, and the light is detected by a PMT attached to the outside of a thick window. However, ultraviolet light absorption in the window and a small field of view limit the efficiency of conversion of scintillation light to photo-electrons.

One example of the apparatus that overcomes these limitations is shown in FIG. 6. A photo-sensor is placed inside a pressure vessel envelope. This is accomplished by using a spherical envelope that is transparent to UV light emitted by a scintillating gas and that is coated with a 3D photocathode on the inside surface. The spherical shape of the photo-sensor can withstand the high gas pressures, for example, up to 100 atm or more, while having a relatively thin wall thickness. The thin wall combined with a transparent material such as quartz or fused silica can reduce light losses. Other shapes can be used, however, such as a cylindrical, pancake, or ovoid envelop. Furthermore, the 3D photocathode may offer substantially greater light detection area and chances for multiple interaction of photons with photocathode than the traditional design of a PMT attached from the outside to a small window, thus increasing the light detection efficiency. The relative size of the spherical photo-sensor and the pressure vessel envelope is a design parameter that has to be optimized for the given application. A relatively small spherical photo-sensor offers more volume for scintillating gas however reduces the active photocathode area. On the other hand, having a spherical photo-sensor with a diameter approaching that of the pressure vessel envelope limits the volume for the scintillating gas while giving a large active photocathode area. Best detector performance is achieved when these two effects are optimally balanced.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An apparatus, comprising:
a substantially spherical, hollow substrate that forms an enclosure comprising a photoemitter, or a photoemitter that forms a substantially spherical, hollow enclosure;
a curved photosensor in direct contact with the photoemitter; and
a photoelectron collector housed in the enclosure.

2. The apparatus of claim 1, wherein the hollow enclosure comprises a substantially evacuated space.

3. The apparatus of claim 2, wherein the photoemitter forms the hollow enclosure.

4. The apparatus of claim 2, wherein the substrate forms the hollow enclosure.

5. The apparatus of claim 4, wherein the substrate comprises one or more cavities.

6. The apparatus of claim 5, wherein the photoemitter is deposited within the cavities.

7. The apparatus of claim 1, wherein the photoemitter comprises a photoemitting gas, an outer surface, and an inner surface.

8. The apparatus of claim 7, wherein the inner surface comprises a wavelength-shifting material and an optically transparent material.

9. The apparatus of claim 8, wherein the photosensor is adjacent to the optically transparent material.

10. The apparatus of claim 1, further comprising an electrically insulative material.

11. The apparatus of claim 10, wherein the photoelectron collector is deposited on the electrically insulative material.

12. The apparatus of claim 1, wherein the photoemitter comprises a pocket.

13. The apparatus of claim 12, wherein the photoemitter further comprises a light guide.

14. The apparatus of claim 12, wherein the photosensitive material is deposited within the pocket.

15. The apparatus of claim 1, further comprising one or more charge multipliers positioned in the substantially evacuated space between the photosensitive component and the photoelectron collector.

16. The apparatus of claim 1, wherein the photoelectron collector has at least one x-component corresponding to an x-dimension, and at least one y-component corresponding to a y-dimension.

17. The apparatus of claim 16, wherein the x- and y-components comprise linear electrically conductive wires, electrically conductive pixels, or both.

18. A method for making an apparatus, comprising:
forming a hollow, substantially spherical enclosure comprising a substantially evacuated space;
positioning a curved photosensor to be in direct contact with a curved photoemitter, wherein the photosensor and photoemitter are within the hollow enclosure; and
positioning a photoelectron collector in operative association with the photosensor and photoemitter within the hollow enclosure.

19. The method of claim 18, further comprising positioning a charge multiplier in the substantially evacuated space between the photosensor and the photoelectron collector.

20. A method, comprising:
providing an apparatus according to claim 1; and
operating the apparatus.

21. A radiation detector, comprising:
a photoemitter material configured to produce light upon receiving incident radiation;
a photosensitive material in direct contact with the photoemitter material and configured to emit photoelectrons in response to receiving at least a portion of the light produced by the photoemitter material; and
a photoelectron collector configured to receive at least some of the photoelectrons emitted by the photosensitive material, wherein the photoelectron collector is separated from the photosensitive material at least in part by an insulator;
wherein the photoemitter material and photosensitive material at least partially surround the photoelectron collector.

22. The radiation detector of claim 21, wherein:
the photoemitter material comprises a scintillator;
the photosensitive material comprises a photocathode;
the photoelectron collector comprises a conductive material;
the insulator comprises air or an inert gas;
the photoemitter material and photosensitive material form at least part of a hollow enclosure containing the photoelectron collector; or
a combination of two or more thereof.

23. A radiation detector, comprising:
a hollow, substantially spherical enclosure, the hollow enclosure comprising a scintillator material in direct contact with a photocathode, wherein the photocathode is configured to emit photoelectrons in response to receiving light produced by the scintillator material; and
a photoelectron collector positioned within the hollow enclosure, wherein the photoelectron collector comprises a conductive material and is separated from the photosensitive material at least in part by an insulator.

* * * * *